Oct. 17, 1933.  E. HAZELL  1,931,002
METHOD OF AND APPARATUS FOR IMPROVING ARTICLES
DEPOSITED FROM RUBBER DISPERSIONS
Filed Dec. 24, 1930

INVENTOR
EARDLEY HAZELL
BY
ATTORNEY

Patented Oct. 17, 1933

1,931,002

UNITED STATES PATENT OFFICE

1,931,002

METHOD OF AND APPARATUS FOR IMPROVING ARTICLES DEPOSITED FROM RUBBER DISPERSIONS

Eardley Hazell, New York, N. Y., assignor to The Naugatuck Chemical Company, Naugatuck, Conn., a corporation of Connecticut Application December 24, 1930
Serial No. 504,538

18 Claims. (Cl. 204—1)

This invention relates to the manufacture of rubber goods and more particularly to the production of rubber articles having improved water and electrical resistance.

The less moisture a rubber compound is capable of absorbing the better is its electrical resistance or insulating properties. A number of articles, particularly those made directly from natural dispersions of rubber or artificially prepared dispersions of crude and/or reclaimed rubber tend to give low insulating properties. This is due to a large extent to the water-soluble constituents of the dispersions which accompany the deposited rubber and remain associated therewith chiefly in the form of hydrophilic colloidal materials, such as soaps and proteins, and water soluble inorganic salts. It is clear that the removal of water solubles from rubber would reduce the capacity of the rubber to absorb and retain moisture and thereby improve its insulating value or resistance to electrical current. This is of primary importance in making rubber articles for such use as electricians' gloves, linemen's sleeves, blankets, etc.

An object of this invention is to provide a means of improving the resistance of rubber goods or articles to water and/or electrical current. Another object is to provide a process whereby the electrical insulating properties of rubber articles formed by deposition from natural or artificially prepared rubber dispersions, may be substantially improved. A further object is to provide rubber products having improved resistance to moisture and/or electrical current.

Figure 1:
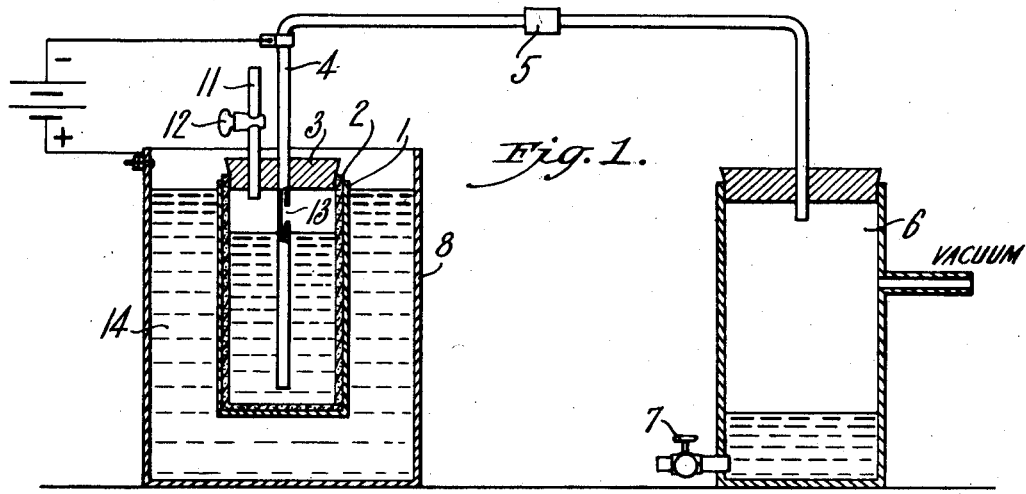
Fig. 1 shows a longitudinal cross-section of a simple apparatus to accomplish the removal of water solubles from rubber.

The invention broadly comprises subjecting the rubber goods whose resistance to moisture and/or electrical current is to be improved, to a process known as electro endosmosis. The fundamentals of electro-endosmosis are well known but attention may be directed to a discussion of this subject, pages 242-243 of Getman's 1922 edition of "Outlines of Theoretical Chemistry", published by John Wiley & Sons, New York. In the process of this application an electric current is caused to flow through a deposit of rubber material, thereby bringing about a flow of water through the deposit which washes out the undesirable water soluble constituents. This is done by arranging an electric cell so that the rubber deposit forms a septum between the positive and negative electrodes, the whole being filled with water or a dilute solution of some electrolyte which is called the wash water or washing solution. The rubber which this invention is particularly intended to improve, is rubber which has been deposited in some desirable shape or form and thickness from natural dispersions of rubber or those dispersions which are artificially prepared from previously coagulated rubbers such as crude and reclaimed rubbers, but the invention is not to be limited to such rubbers since it may be applied wherever the washing or purification of any rubber compound is desirable, for example rubber reclaim or crude rubbers such as spray-dried latex rubbers and crepe rubbers, etc. Crude latex-sprayed rubbers particularly contain relatively large proportions of water-soluble materials which render this rubber highly water absorbent and non-resistant to the passage of electrical current. In the deposition processes the rubber dispersions usually contain compounding ingredients, fillers, curing and anti-ageing ingredients, etc. Certain of these ingredients are generally of hydrophilic colloidal character, such as soaps, proteins, while others are water soluble and non-colloidal such as water soluble inorganic salts. Whether the deposition of rubber is caused by an electro-deposition method or by what is known as the single dip or repeated dip methods, there is a certain amount of water-loving or water soluble materials associated with the deposited rubber and one of the aims of this invention is to reduce the amount of such materials in the rubber deposit.

In the dipping processes the form for the rubber deposit may be preliminarily coated with a substance capable of retaining or holding a rubber coagulant, such as gelatine, and treated with a rubber coagulant before dipping one or more times, as desired, into the rubber dispersion, or the form may itself be capable of retaining the rubber coagulant (e. g. a porous unfired clay form), in which case it may be dipped into coagulant and then into the rubber dispersion, or an initial deposit of rubber itself may be used as a means of holding rubber coagulant for any next subsequent layer of rubber that is to be deposited.

In the repeated dip method the intermediate washing of the layers of rubber may be carried out to any desired extent, or the intermediate washing may be omitted entirely and the rubber deposit built up by alternate dipping and coagulation. It is to be understood that the present invention is not to be limited to any particular way of forming rubber articles of desired thickness from rubber dispersions, so long as the deposited rubber is susceptible to the endosmosis treatment indicated herein. The rubber to be treated may be formed on a porous or non-porous form of the desired shape, but where formed on a non-porous form the rubber may be either transferred to a porous form or support for the purposes of this invention, or the layer of rubber compound, which is porous, may be used without a porous support, such as in the forms of a sack, septum or membrane, if supported in other ways.

Figure 2:
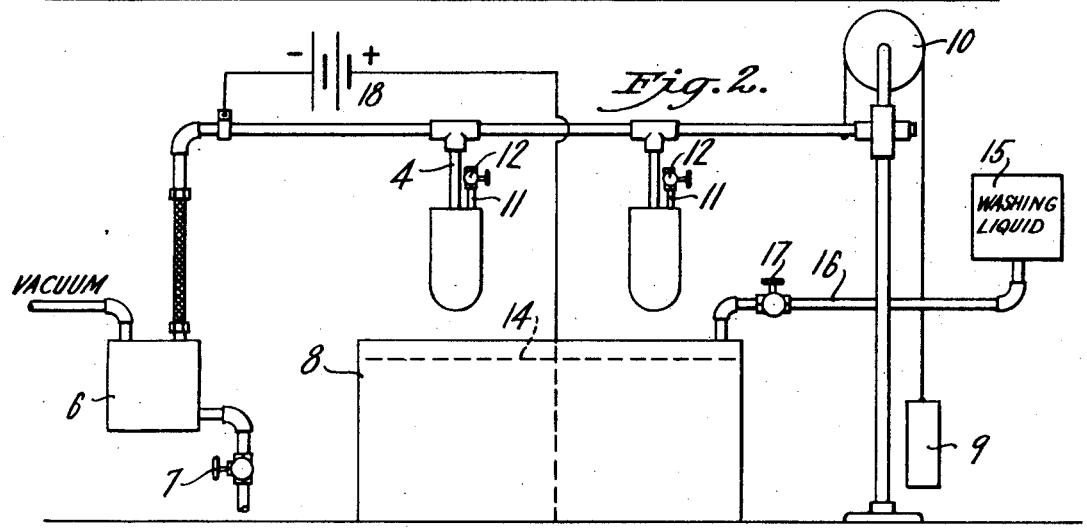
Fig. 2 shows a longitudinal side elevational view of a similar apparatus adaptable to a commercial scale of opertions.
Figure 3:
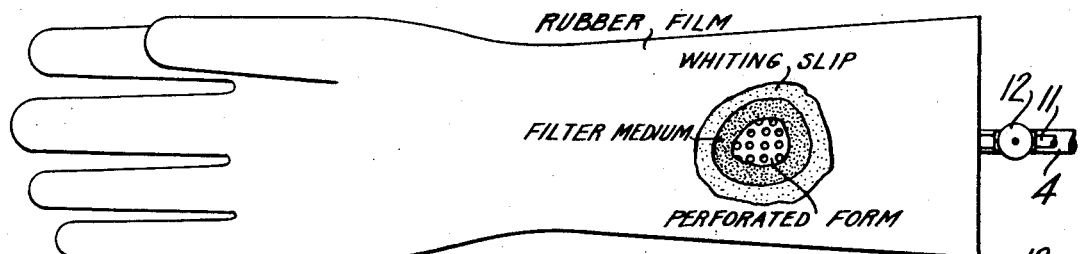
Fig. 3 is a front elevational view partly in cross section of a preferred porous support or form for the rubber to be treated.
Figure 4:
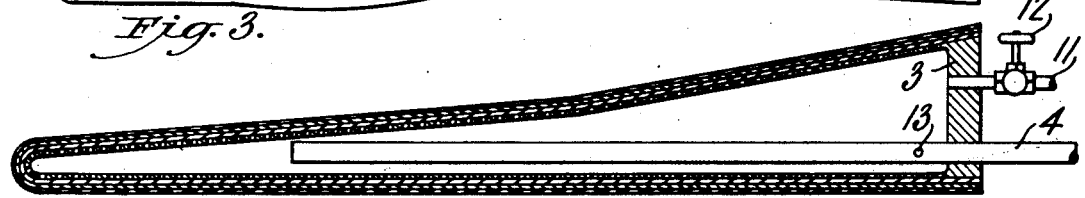
Fig. 4 is a longitudinal cross-section of the form shown by Fig. 3 to more clearly illustrate the constituent parts.

In the drawing, 1 represents the layer of the rubber compound or article to be treated, 2 is the porous support or form, 3 is a closure for the interior of the form and may be integral with or separate from the form proper, 4 is a removal conduit for the water and water soluble constituents and extends into the interior of the support or form. 4 is supported in any desired manner and is attached to a main suction line or conduit by a connection such as 5, which main suction line leads to a source of vacuum and tank 6 for the aqueous liquor. A valve 7 allows of suitable disposition of the contents of tank 6. In practice 2 and 4 may be connected to the main suction line in a manner to allow raising and lowering of 2 as by a weight 9 and pulley 10 arrangement, into and out of the treatment tank 8, which may be divided, if desired, into separate compartments for the forms. 8 is preferably lined with metal to allow it to be one of the electrodes of the process. Connected to the closure 3 is pipe 11 and valve 12 for conveniently filling and emptying the porous form of liquor. In a portion of 4 confined within the form is a withdrawal port 13 for aqueous liquor. The placement of the port 13 regulates the withdrawal of water solubles from the rubber and the amount of aqueous liquor reserved in the interior of the form. 14 is the electrolyte which besides being the medium for the electrical current, acts to supply the washing fluid for removing water-solubles from 1. The electrolyte or washing liquor is supplied to 8 from a tank 15 (Fig. 2) through pipe 16 and valve 17 which is regulated to furnish washing fluid in pace with its withdrawal at 13 during the treatment. 18 is a source of electrical current which is shown as connected to 4 as a cathode electrode and 8 as an anode electrode. With a given electrolyte, these polarities may be reversed if desired, and by obvious change with the other elements of the apparatus the flow of wash water through the rubber may also be reversed. Figs. 3 and 4 illustrate a preferred type of support for the rubber article. The support embodies an inner perforated metallic mandrel which allows easy insertion or attachment of the pipe 4 through the upper end, a first layer of a finely divided filtering substance held together by a suitable binder, for example a Bakelite-celite coating, and a second layer or slip of such as whiting which is renewable and upon which the rubber is previously deposited from the rubber dispersion.

A preferred manner of practicing the invention is given herewith, illustrating the same with a single dip method and a repeated dip method.

A—Single dip method—The metallic perforated mandrel carrying the adherent porous filtering layer is thoroughly wetted with water, attached through 4 with the vacuum line and dipped into a whiting "slip" (15 parts whiting, 85 parts water) for five seconds with the vacuum on. This deposits a layer of whiting on the porous form. The water which filters into the interior of the form is removed by turning up the form so that the water runs out through 11, the vacuum in the interior of the form being maintained. The form is partially dried in this position for 1–2 minutes and then dipped into a latex having the composition

|  | Parts by weight |
|---|---|
| Rubber | 100 |
| Mineral oil (#8 oil) | 10 |
| Lithopone | 20 |
| Zinc oxide | 5 |
| Accelerator (heptaldehydeaniline condensation product) | .125 |
| Sulphur | 2 |

After about 18–20 minutes immersion in the latex with vacuum on, the form is removed, and the serum allowed to run from the mandrel by turning it up as described, vacuum being maintained in the interior of the form. The length of time of immersion in the latex depends on how rapidly the latex deposits and the thickness of rubber film desired. The deposited film is then partially dried by leaving the vacuum on for about 5 minutes. In order to avoid "blisters" or "pits" in the final product the rubber should be dried before subjecting it to the electro-endosmosis treatment. In this instance the rubber film or layer is additionally dried at 180° F. for a length of time depending on the thickness of the film, for example a .040" deposit requires about 20–25 minutes while a .060" rubber deposit requires about 30–35 minutes. A vacuum is maintained in the interior of the form during the drying to assist in the removal of moisture.

The mandrel form and rubber film is lowered into 8 containing a suitable supply of an electrolyte, for example an ammonia solution containing 200 cc. of 28% ammonia per 5000 cc. of water. Through pipe 11 the interior of the form is filled with the same solution, connections are made to the source of current 18 and a vacuum of about 30 cms. mercury is placed in operation through 4, after shutting the valve 12. It is preferred to make the perforated metallic support of the form a part of the cathode electrode although an inner separate electrode may be used. A current of one ampere, at a potential of 40–50 volts across the cathode and anode is maintained for about one hour. From 200–300 ccs. of electrolyte is passed through the rubber layer, through 13 and over into tank 6 (Fig. 1). The porous form and rubber film are then removed and the film dried at 180° F. for about one hour, a vacuum being maintained in the interior of the form. The deposit of rubber is then cured on the form for 30 minutes at 25 pounds steam pressure in a French press.

Blanks were treated in exactly the same manner except that electro-osmotic washing was omitted.

The treated and untreated samples were subjected to water absorption tests. These tests are made by immersing weighed samples of the blank and treated samples of approximately the same size and weight, in water for a number of hours. The rubber films are then taken out, dried between filter papers, until substantially all surface moisture is removed, and weighed. The percent absorption given is the weight of water absorbed per gram of sample (times 100). Table I shows the results of water absorption tests on samples made as described above, while Table II shows the results of electrical tests on a number of the rubber films.

*Table I.—Water absorption tests*

| Sample | Percentage absorption after: | |
|---|---|---|
| | 24 hrs. immersion | 168 hrs. immersion |
| P—44 (untreated) | 0.73% | |
| P—43 (treated) | 0.15% | |
| P—30 (untreated) | 0.65% | 1.30% |
| P—27 (treated) | 0.06% | .19% |
| P—25 (treated) | 0.12% | .48% |

*Table II.—Electrical tests*

| Sample | Leakage (milliamps at:) | | Breakdown voltage |
|---|---|---|---|
| | 10,000 volts | 16,000 volts | |
| P—39 (treated) | 0 | Punctured | 16,000 |
| P—40 (treated) | 1 | 3 | 23,000 |
| P—42 (treated) | 2 | 5½ | 16,000 |
| P—45 (untreated) | Punctured | | 10,000 |

These results show marked improvement in water absorption and electrical resistance resulting from the electro-osmotic washing of this invention.

B. Repeated dip method—A compounded latex of the following composition is used:

| | Parts by weight |
|---|---|
| Rubber (as creamed latex) | 100 |
| Crimson antimony | 4 |
| Precipitated sulphur | 4 |
| Ammonium laurate | .5 |
| Accelerator (heptaldehydeaniline condensation product) | .5 |
| Zinc oxide | .1 |

The ingredients may be added as pastes or emulsions. A porous form is dipped in the latex composition for 15 seconds, allowed to drain for 30 seconds, then dipped in a coagulating mixture (50% of 95% alcohol and 50% of 80% acetic acid by volume) for 10 seconds. The acid is allowed to partially dry at room temperature for 10 minutes, then the form and coagulated film are again dipped into the latex composition for 1 minute, drained 30 seconds, dipped in coagulant 10 seconds, and dried for 10 minutes at room temperature. The film is then dried at 82° C. for 30 minutes and stripped from the form.

The rubber film of desired shape or form is used as a bag and filled with and immersed in the ammoniacal water (5000 cc. of water per every 200 cc. of 28% ammonia) of the tank 1 as described. A current of 1 ampere at about 130 volts is passed through the rubber for about 1 hour, the electrode inside the bag being the cathode pipe 4. The film is then dried at 85° C. for 2½ hours and vulcanized in steam at 40 lbs. pressure for 25 minutes.

A blank was treated in exactly the same manner except that the electro-osmotic washing process was omitted.

The following table shows the results of water absorption tests an samples of the treated and untreated films of the same area:

*Table III*

| Sample | % absorption after 24 hrs. immersion | % absorption after 1 wk. immersion |
|---|---|---|
| 34 (untreated) | 1.07 | 2.65 |
| 35 (untreated) | 1.14 | 2.81 |
| 36 (treated) | .69 | 1.87 |
| 37 (treated) | .57 | 1.51 |
| 38 (treated) | .48 | 1.32 |
| 39 (untreated) | 1.22 | 2.83 |
| 54 (treated) | .33 (46 hrs. immersion). | 1.45 (16 days immersion). |
| 55 (untreated) | 1.43 (46 hrs. immersion). | 4.47 (16 days immersion). |

These results show the marked improvement in resistance to moisture resulting from the treatment of rubber films, formed by the "acid-dip" method, by the washing process described.

The above described process of washing rubber that is carried out by apparatus such as shown in Figs. 1 to 4, is designated electro-endosmosis or electro-osmosis. The amount of water soluble material removed from the rubber deposit depends on the quantity of wash water passed through a unit area of the rubber. The quantity of water passing through the rubber deposit in a given time, that is, the velocity will depend upon:

1. The composition of the electrolyte solution (washing solution).

2. The potential gradient "$H=$"$\frac{E}{L}$ where E is the potenial difference betwen the electrodes which determines the potential difference across the diaphragm, and L is the distance between the electrodes.

3. Quantity of electricity per unit area of rubber; i. e. current density.

4. The thickness of the rubber deposit and of the porous form as well as the average pore size and number of pores. These factors, of course, determine resistance to the flow of the wash water through the rubber and porous form, and consequently affect the rate of flow.

The latex compound may be made rapid depositing by any of the known methods, and while a porous form for a glove is shown by the drawing, the form may be of any desired shape for making other rubber articles such as inner tubes, etc. The amount of washing required will depend on the degree of electrical resistance required and this can be determined roughly by water absorption experiments on the dry rubber. Also the rubber to be treated may be in any desired form or shape; it may be treated while carried on a porous support or base or it may be treated without the use of such base, in the form of a sack, septum or membrane, as may be desired or found suitable.

The expression "rubber" as used herein is to be construed broadly as including caoutchouc, balata, gutta percha, synthetic rubbers, as well as allied gums and resins. The term "latex" is to include natural aqueous rubber dispersions as well as aqueous dispersions of rubber that are artifically prepared, concentrated or unconcentrated and with or without vulcanizing ingredients, vulcanized latex. The term "rubber goods" as used in the claims is generic to articles or stocks composed entirely or partly of rubber and to associations of rubber and strain-resisting material including what is known in the art as single and double texture proofed goods. The stocks may be compounded or uncompounded, for instance such as crude or reclaim rubbers may be treated according to the invention.

Having thus described my invention, what I claim and desire to protect by Letters Patent is:

1. A method of improving rubber goods which comprises passing a body of liquid capable of removing water solubles from rubber goods through the rubber compound by electro-endosmosis.

2. A method of improving rubber goods having rubber thereof deposited from latex which comprises passing an aqueous solution capable of removing water solubles from the rubber deposit through at least a portion thereof by electro-endosmosis.

3. A method of improving rubber goods having rubber thereof deposited from latex which comprises passing an aqueous solution capable of removing water solubles from the rubber deposit through at least a portion thereof by electro-endosmosis, and subsequently drying and vulcanizing the rubber.

4. A process of purifying a rubber compound which comprises washing water solubles from said compound by electro-endosmosis while said compound is suspended in the form of a septum or membrane in an aqueous electrolyte.

5. A method of improving rubber goods previously formed by deposition from latex which comprises passing water of an aqueous electrolyte solution through at least a portion thereof by electro-endosmosis to wash water solubles therefrom.

6. A method of improving rubber goods previously formed by deposition from latex upon a porous form which comprises passing an aqueous solution capable of removing water solubles from the rubber deposit through said form and rubber deposit by electro-endosmosis.

7. A method of improving rubber goods previously formed upon a porous form by deposition from latex which comprises passing water of an aqueous electrolyte solution capable of removing water solubles from the rubber deposit through said form and rubber deposit by electro-endosmosis, and subsequently drying and vulcanizing the rubber.

8. A method of improving rubber goods previously formed by deposition from latex upon a form comprising a perforated metallic support which comprises washing water solubles from the rubber deposit by passing a liquid capable of removing water solubles from the rubber deposit through the same by electro-endosmosis while making said metallic support one of the electrodes.

9. A method of improving rubber goods previously formed by deposition from latex upon a form comprising a perforated metallic support which comprises continuously washing water solubles from the rubber deposit by electro-endosmosis while making said metallic support one of the electrodes.

10. A method of improving rubber goods previously deposited from latex upon a form comprising a perforated metallic support which comprises continuously washing water solubles from the rubber deposit by electro-endosmosis while making said metallic support one of the electrodes and subsequently drying and vulcanizing the rubber.

11. A method of making an improved rubber article which comprises depositing the article in the desired shape and thickness from latex upon a form comprising a perforated metallic support, substantially drying the deposited rubber and then washing water solubles from the rubber deposit by electro-endosmosis with the aid of an aqueous solution while making said metallic support one of the electrodes and subsequently drying and vulcanizing the rubber deposit.

12. An apparatus for improving rubber goods by washing water solubles therefrom which comprises an electro-osmotic cell in which the porous diaphragm embodies a perforated mandrel or form of the desired shape carrying a formed rubber deposit of the desired thickness and the electrolyte is an aqueous solution capable of removing water solubles from the rubber deposit which serves as the washing liquor, a source of electric current, and means for supplying the washing liquor to the cell for passage through the rubber deposit.

13. An apparatus for improving rubber goods by washing water solubles therefrom which comprises in combination an electro-osmotic cell in which the porous diaphragm embodies a layer of the rubber to be treated and the electrolyte of the cell is a liquid capable of removing water solubles from the rubber deposit which serves as the washing liquor, a source of electric current, and means for supplying the washing liquor to the cell for passage through the layer of rubber.

14. An apparatus for improving rubber goods by washing water solubles therefrom which comprises in combination an electro-osmotic cell in which the porous diaphragm embodies a layer of the rubber to be treated and the electrolyte of the cell is an aqueous solution capable of removing water solubles from the rubber deposit which serves as the washing liquor, a source of electric current, and means for continuously replenishing and removing the washing liquor of the cell.

15. An apparatus for improving rubber goods by washing water solubles therefrom which comprises in combination an electro-osmotic cell in which the porous diaphragm embodies a perforated mandrel or form of the desired shape carrying a formed rubber deposit of the desired thickness and the electrolyte of the cell is an aqueous solution capable of removing water solubles from the rubber deposit which serves as the washing liquor, a source of electric current, and means for continuously replenishing and removing the washing liquor of the cell.

16. A method of improving a crude or reclaim rubber which comprises washing water solubles from said rubber by passing therethrough by electro-endosmosis a body of liquid capable of removing water solubles from said rubber.

17. A method of making an improved rubber article comprising forming a completed and substantially dried rubber article in the shape desired, and passing a liquid capable of removing water solubles from the article through at least a portion of the same by electro-endosmosis.

18. A method of making an improved rubber article comprising forming a rubber article in the shape desired by deposition from latex, substantially drying the rubber deposit, and then passing a liquid capable of removing water solubles from the article through at least a portion of the same by electro-osmosis.

EARDLEY HAZELL.